United States Patent [19]

Leikam et al.

[11] 4,441,163
[45] Apr. 3, 1984

[54] DYNAMIC SEND QUEUE MODIFICATION SYSTEM

[75] Inventors: Gary E. Leikam, Austin; Robert L. Wierwille, Leander; Rebecca S. Wood, Austin, all of Tex.

[73] Assignee: International Business Machines Corporation, Armonk, N.Y.

[21] Appl. No.: 274,352

[22] Filed: Jun. 16, 1981

[51] Int. Cl.³ .......................... G06F 3/04; G06F 3/14
[52] U.S. Cl. .................................................. 364/900
[58] Field of Search ... 364/900 MS File, 200 MS File

[56] References Cited

U.S. PATENT DOCUMENTS

| Re. 31,182 | 3/1983 | Crager et al. | 178/3 |
|---|---|---|---|
| 4,030,077 | 6/1977 | Florence et al. | 364/900 |
| 4,125,870 | 11/1978 | Suzuki et al. | 364/900 |
| 4,138,732 | 2/1979 | Suzuki et al. | 364/900 |
| 4,320,455 | 3/1982 | Woods et al. | 364/200 |
| 4,348,739 | 9/1982 | Deaver et al. | 364/900 |

FOREIGN PATENT DOCUMENTS 2813687 10/1979 Fed. Rep. of Germany ...... 364/200

Primary Examiner—Jerry Smith
Assistant Examiner—Mark P. Watson
Attorney, Agent, or Firm—Harold E. Meier

[57] ABSTRACT

A data communications system to provide for the dynamic modification of a queue of documents arranged sequentially for transmission. An operator interacts with the send queue by making the send queue selection from a menu of communication request tasks on a display. Selection of the addition to the send queue option invokes a routine to add a send job. Operator selection of the display send queue option invokes a routine to display the send queue in the display for review of the current send queue and its status. A delete send job option invokes a routine to allow the operator to delete any job from the send queue except the one currently being sent. The select next send job option invokes a routine to allow the operator to start or restart the sending process from any point within the send queue.

19 Claims, 16 Drawing Figures

COMMUNICATION REQUEST
MENU PROCESSING

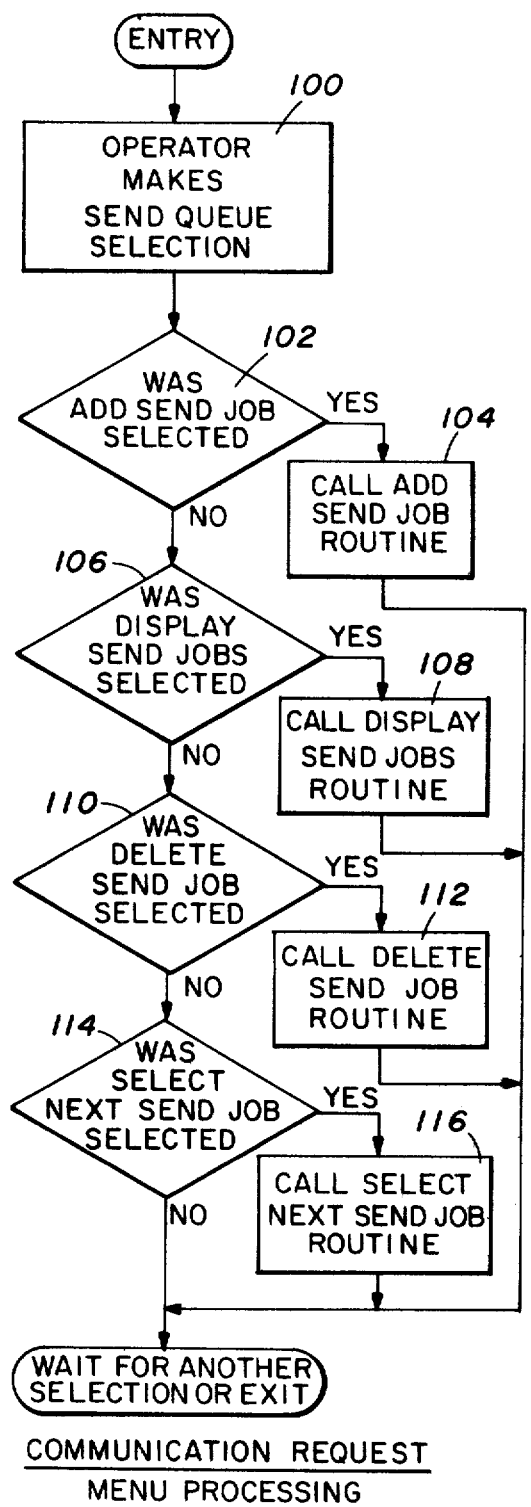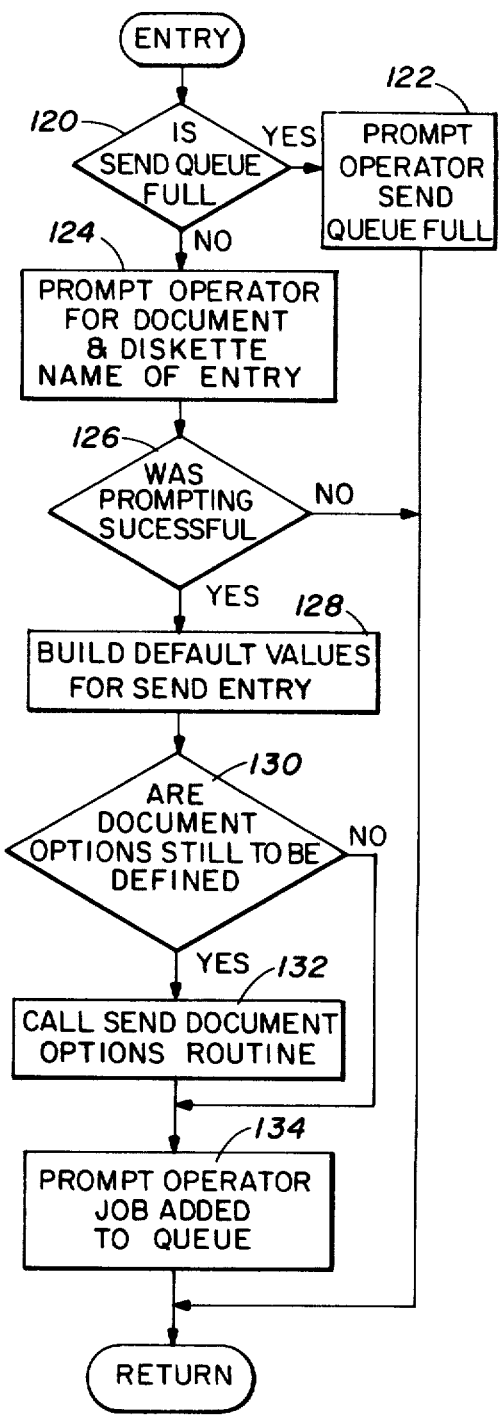
FIG. 3 — COMMUNICATION REQUEST MENU PROCESSING
FIG. 4 — ADD SEND JOB ROUTINE

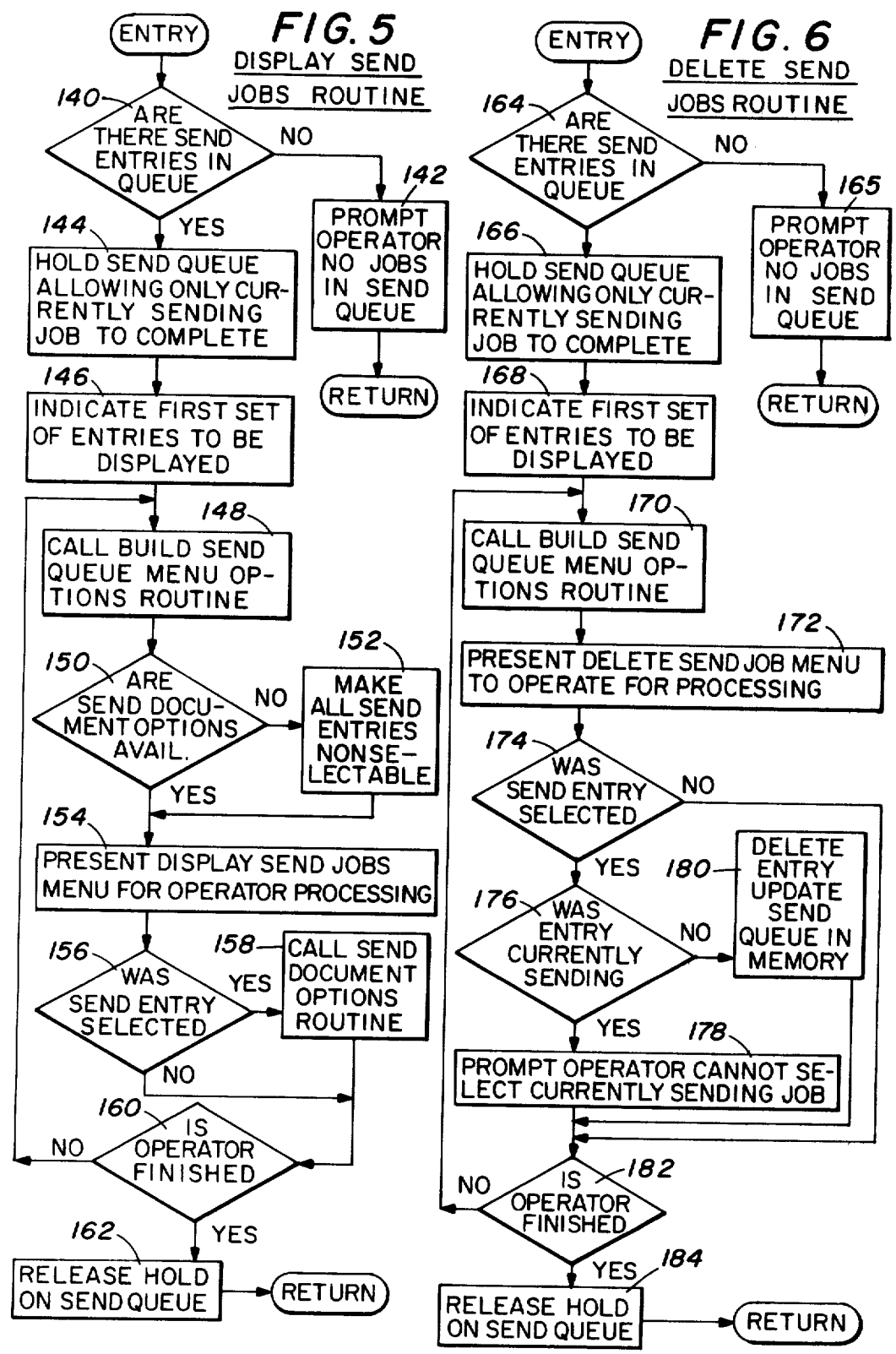

SELECT NEXT SEND JOB

SETUP SELECTION MENU (BISYNC COMMUNICATION)

SESSION SUMMARY

```
| COMMUNICATION |   |   |   |       |   |
| SYSDIS |   |   |   |   | KYB 1 |   |
```

REQUEST TASKS

| ID | NAME |
|----|------|
| a | SEND DOCUMENT |
| b | DISPLAY SEND QUEUE |
| c | SELECT NEXT SEND JOB |
| d | DELETE SEND JOB |
| e | CHANGE SESSION OPTIONS |
| f | DISPLAY INDEX OF DISKETTE CONTENTS |
| g | PRINTER REQUESTS |

WHEN FINISHED WITH THIS MENU, PRESS ENTER.

TYPE ID LETTER TO CHOOSE ITEM; PRESS ENTER: ▯

COMMUNICATION REQUEST TASKS MENU (BISYNC)

*FIG. 12*

```
| COMMUNICATION | DOC 9 |   |   |       |   |
| SYSDIS |   |   |   |   | KYB 1 |   |
```

SEND DOCUMENT OPTIONS

| ID | ITEM | YOUR CHOICE | POSSIBLE CHOICES |
|----|------|-------------|------------------|
| a | SEND FORMAT | 3 | 1 = CARD IMAGE<br>2 = PAGE IMAGE TEXT ONLY<br>3 = PAGE IMAGE WITH OCL<br>4 = PAGE IMAGE WITH FORMAT LINE<br>5 = MEDIA IMAGE |
| b | VALID REMOTE ID's | 1 2 3 4 | ONE OR MORE NUMBERS SEPARATED BY SPACES, WHERE:<br>1 = RUID00   2 = LOC001<br>3 = AUS993   4 = BLDR00 |
| c | APPEND NEXT DOCUMENT | 2 | 1 = YES   2 = NO |

WHEN FINISHED WITH THIS MENU, PRESS ENTER.
TYPE ID LETTER TO CHOOSE ITEM; PRESS ENTER: ▯

SEND DOCUMENT OPTIONS MENU

*FIG. 13*

```
| COMMUNICATION |   |   |   |   |   |
| SYSDIS |   |   |   |   | KYB 1 |
```

DISPLAY SEND QUEUE

```
      REMOTE ID    DISKETTE
  ID   1 2 3 4     NAME        DOCUMENT NAME

> a    *   *       SYSDIS      DOC 9
  b     * *        SYSDIS      DOC 5
  c    * * *       SYSDIS      FORM 3
  d         *      SYSDIS      MEMO 1
  e    * * * *     SYSDIS      MEMO 3
```

> THIS DOCUMENT WILL BE SENT NEXT.
  WHEN FINISHED WITH THIS MENU, PRESS ENTER.

TO DISPLAY OR CHANGE SEND OPTIONS FOR A JOB,
TYPE ID LETTER; PRESS ENTER: *

DISPLAY SEND QUEUE MENU

FIG. 14

```
| COMMUNICATION |   |   |   |   |   |
| SYSDIS |   | ON-LINE SEND |   |   | KYB 1 |
```

DELETE SEND JOB

```
       REMOTE ID   DISKETTE
   ID   1 2 3 4    NAME        DOCUMENT NAME a    *   *      SYSDIS      DOC 9
   b     * *       SYSDIS      DOC 5
 # c    * * *      SYSDIS      FORM 3
   d        *      SYSDIS      MEMO 1
 > e    * * * *    SYSDIS      MEMO 3
```

\# THIS DOCUMENT IS SENDING NOW.
> THIS DOCUMENT WILL BE SENT NEXT.
  WHEN FINISHED WITH THIS MENU, PRESS ENTER.

TYPE ID LETTER TO CHOOSE ITEM; PRESS ENTER: *

DELETE SEND JOB MENU

FIG. 15

```
┌─────────────────────────────────────────────────────────┐
│ COMMUNICATION   |         |         |                   │
│ SYSDIS |   |         |    |     |KYB 1  |               │
│              SELECT NEXT SEND JOB                       │
│     REMOTE ID   DISKETTE                                │
│  ID  1 2 3 4    NAME      DOCUMENT NAME                 │
│                                                         │
│ > a  *   *      SYSDIS    DOC 9                         │
│   b    * *      SYSDIS    DOC 5                         │
│   c  * * *      SYSDIS    FORM 3                        │
│   d      *      SYSDIS    MEMO 1                        │
│   e  * * * *    SYSDIS    MEMO 3                        │
│                                                         │
│                                                         │
│ > THIS DOCUMENT WILL BE SENT NEXT.                      │
│   WHEN FINISHED WITH THIS MENU, PRESS ENTER.            │
│                                                         │
│   TYPE ID LETTER TO CHOOSE ITEM; PRESS ENTER: X         │
└─────────────────────────────────────────────────────────┘
```

SELECT NEXT SEND JOB MENU

*FIG. 16*

DYNAMIC SEND QUEUE MODIFICATION SYSTEM

BACKGROUND OF THE INVENTION

1. Field of the Invention

This invention relates to a communication system for dynamically modifying a queue of documents arranged for transmission. In particular, it pertains to a communication system to provide an operator with the capability of accessing entries in the send queue which have not been transmitted. The system allows the operator to alter, revise or otherwise change the transmission sequence of these entries prior to the transmission as a foreground systems task while the background system transmission or reception of the documents continues.

2. Description of the Prior Art

Electronic digital signal processing systems have been developed as operator controlled word and data processing machines. Word/data processing machines have also been provided with communication systems wherein one signal processing system is transmitting documents to one or more other signal processing systems. In communication systems for word processing systems, a word processing display terminal may transmit documents to one or more data receiving terminals which also may be word processing terminals. In such communication systems, it is well known to arrange the documents to be transmitted in a sequential queue, also known as the send queue.

Operator intervention may be required following the start of the transmission of documents in the send queue to the data receiving terminal. For example, the operator may desire to add a document to the send queue, delete a document previously placed in the send queue, or revise the send queue because of a detected error. In present word processing communication systems, the entire transmission must be interrupted in order to alter entries in the send queue. Present communication systems do not have the capability of altering the entries in the send queue dynamically while the background transmission or reception of documents continues.

The absolute separation between the communication task setup and its execution was a limitation of prior communication systems. In such prior communication systems, the send queue had to be completely and correctly specified off line prior to the commencement of transmitting documents. If a new document had to be entered to the send queue or if changes were required in any of the options associated with a queue entry, all communication activity had to be terminated while the change was made and session activity then restarted.

In addition, in present communication systems the situation may arise where the sending operator desires to "backup" and resend one or more jobs which have previously been sent during a session activity. As one example of this, the data receiving terminal may have had a temporary diskette problem which has been corrected. The operator may desire transmission to resume at the start of the aborted job. The sending operator may also have incorrectly specified a send document option (e.g., wrong data stream type) which has been noted and corrected and now the operator wishes to resend the job. In some communication systems where the sequence of the documents is not critical, one way to accomplish these corrections is simply to requeue the send document at the end of the queue and delete the earlier entry. However, this approach which may be taken with present communication systems cannot be used when the sequence of the documents is critical. In this situation, the operator must resend the sequence of jobs from the beginning.

A need has thus arisen for an improved communications system for word/data processing systems which enables the operator to dynamically alter the send queue to revise, remove or substitute documents without interrupting the transmission session. A need has also arisen for operator capability in a communication system to cause a sending sequence to be changed to any point in the queue without affecting the ordering of the queue.

SUMMARY OF THE INVENTION

The communications system of the present invention provides the operator with access to the queue build-/revision functions during the execution of the task or when the session is active. The send queue defines the work the operator has instructed the communications system to perform. In a communications system of the present invention, the "foreground" operator interaction with the queue and the "background" batch execution of the elements in the queue are separate and distinct "processes," with minimal coupling between them. Commands such as "send document" may be added to the send queue at anytime before or during the session.

In the IBM Communicating Displaywriter system incorporating the invention, the mechanism for interacting with the send queue is identified as the Communications Request Task. A "task" is a basic unit of work to be accomplished by the operator, e.g., Typing Tasks to prepare textual documents or Work Diskette Tasks to utilize the diskette.

Following Setup Selection the functions of the Communications Request Task are accessible so that the operator may interact with and control asynchronous background processes. The Communication Request Task enables the operator to display a menu showing the content of the send queue. The operator may make the appropriate keyboard selection to access any subordinate menus associated with that command for review and/or revision. The only restriction in the dynamic modification of the send queue is that the command currently being sent cannot be revised.

By accessing the send queue through the Communications Request Task, the operator can also delete entries from the send queue or effect changes to the processing sequence. As part of the Binary Synchronous Communications Feature enabling the system to send and receive documents, the operator can change a point at which sending will continue following completion of the current job to any point in the queue, forward or backward.

The operators action in accessing the send queue for review or revision will cause an "implicit hold" to be placed on the send queue which will suspend processing of any command in the queue beyond the command currently being sent. The transmission of the current command is allowed to continue to normal completion, and the operator is prevented from making any changes which might affect the execution of that command. The suspension takes affect immediately upon completion of the current command, allowing the operator to complete any desired modifications to subsequent commands in the send queue. Send processing resumes automatically when the operator exits from the menu.

In using the communication system of the present invention, the operator may choose to execute the communications task in a purely batch mode, creating the send queue prior to session establishment. On the other hand, the system provides the operator with the flexibility to execute the task in a "quasi-interactive" mode, specifying the command/documents to be sent dynamically during the course of the session.

The communications system of the present invention also has the feature which enables the operator to cause the sending sequence to be changed to any point in the queue without affecting the order of the queue. In the IBM communicating Displaywriter incorporating the present invention, the "select next send job" option may be selected from the Communications Request Task menu to cause the send queue to be displayed. The queue entries are normally processed sequentially in the order shown on the display, starting at the top of the queue. When the "selective exchange" function is active, queue entries will be bypassed if not scheduled for the current session. Send jobs remain in the queue after they are sent to allow for possible reuse of the same queue for a later session. Jobs are deleted from the send queue only upon a explicit operator action.

The operator can change the point at which the send queue processing will continue upon completion of the current job to any point in the queue, either forward or backward from the normal "next" send job. This may be done by simply selecting the desired entry on the menu of the send queue by an indicator moved on the display screen to the specified job. Thus, the operator can alter the transmission sequence to cause one or more previous jobs to be resent, or alternatively, to cause one or more jobs in the queue to be skipped.

BRIEF DESCRIPTION OF THE DRAWINGS

For a more complete understanding of the present invention and the advantages thereof, reference is now made to the following Detailed Description taken in conjunction with the accompanying Drawings, in which:

FIG. 3 is a flow chart diagram of the communication request menu processing routine;

FIG. 4 is a flow chart diagram of the add send job routine;

FIG. 5 is a flow chart diagram of the display send jobs routine;

FIG. 6 is a flow chart diagram of the delete send job routine;

FIG. 12 is an illustration of the Communication Request Tasks Menu (Binary Synchronous Communication) displayed to the operator;

FIG. 13 is an illustration of an example of the Send Document Options Menu displayed to the operator;

FIG. 14 is an illustration of an example of the Display Send Queue Menu displayed to the operator;

FIG. 15 is an illustration of an example of the Delete Send Job Menu displayed to the operator; and FIG. 16 is an illustration of an example of the Select Next Send Job Menu displayed to the operator.

DETAILED DESCRIPTION

Figure 1:
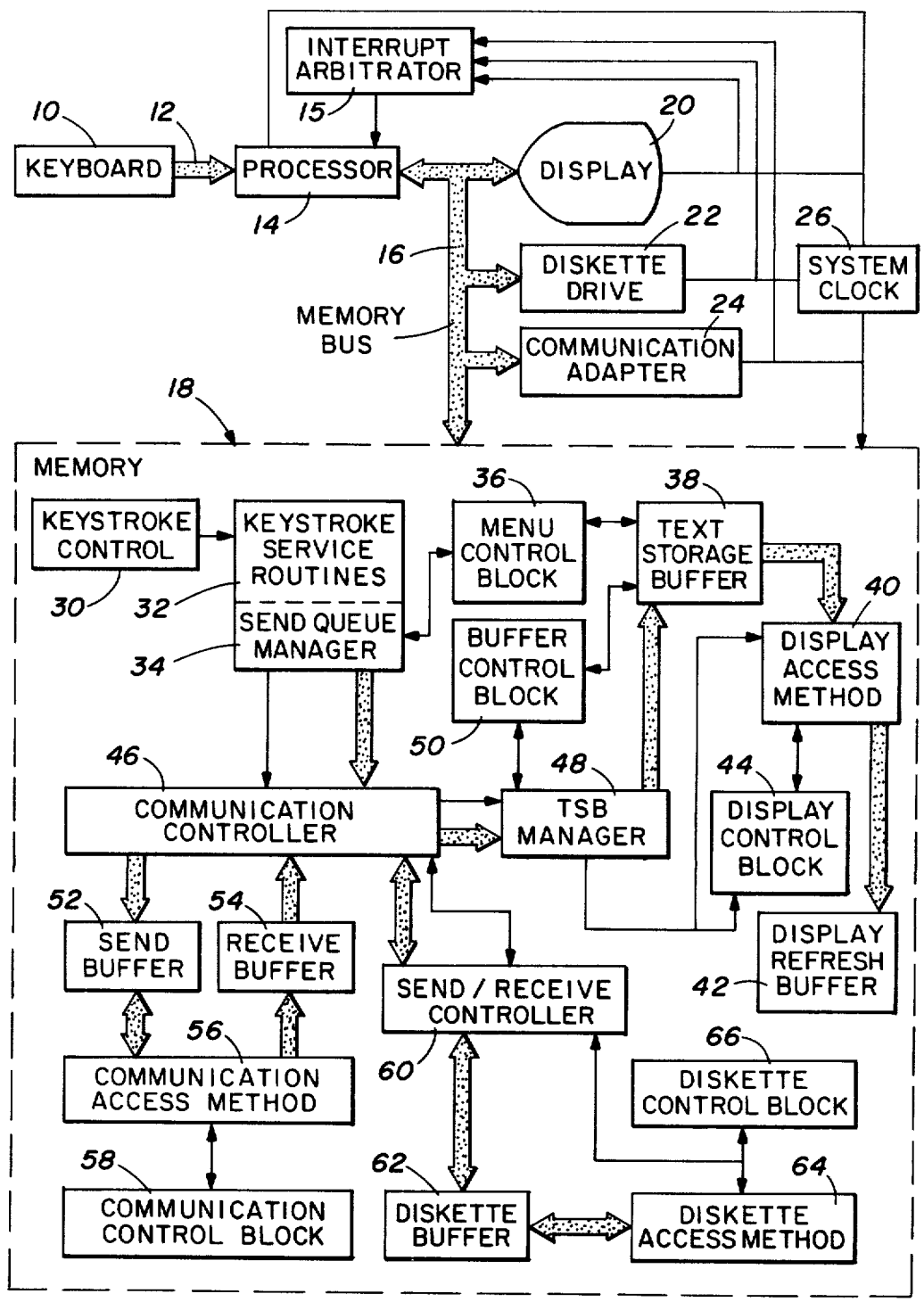
FIG. 1 is a block diagram of a word/data processing system utilizing the present invention.

Referring to FIG. 1, a block diagram of a word/data processing system implementing the present invention is illustrated. A keyboard 10 is provided for inputting graphic characters, data and instructions to the word/data processing system. The graphic characters, data and instructions on the keyboard 10 are applied through a data bus 12 to an electronic digital signal processor 14 of the system. Processor 14 may be implemented by a commercially available microprocessor, such as the Intel Corporation's 8086 processor. The Intel 8086 processor executes on one level with one set of registers.

The keyboard 10 also applies a hardware interrupt signal via interrupt line to an interrupt arbitrator 15. The 8259-A Interrupt Controller was selected to implement the interrupt lines. The 8259-A Interrupt Controller may resolve interrupt requests from up to eight interrupt lines into eight priority levels of the 8086 processor 14.

Figure 2:
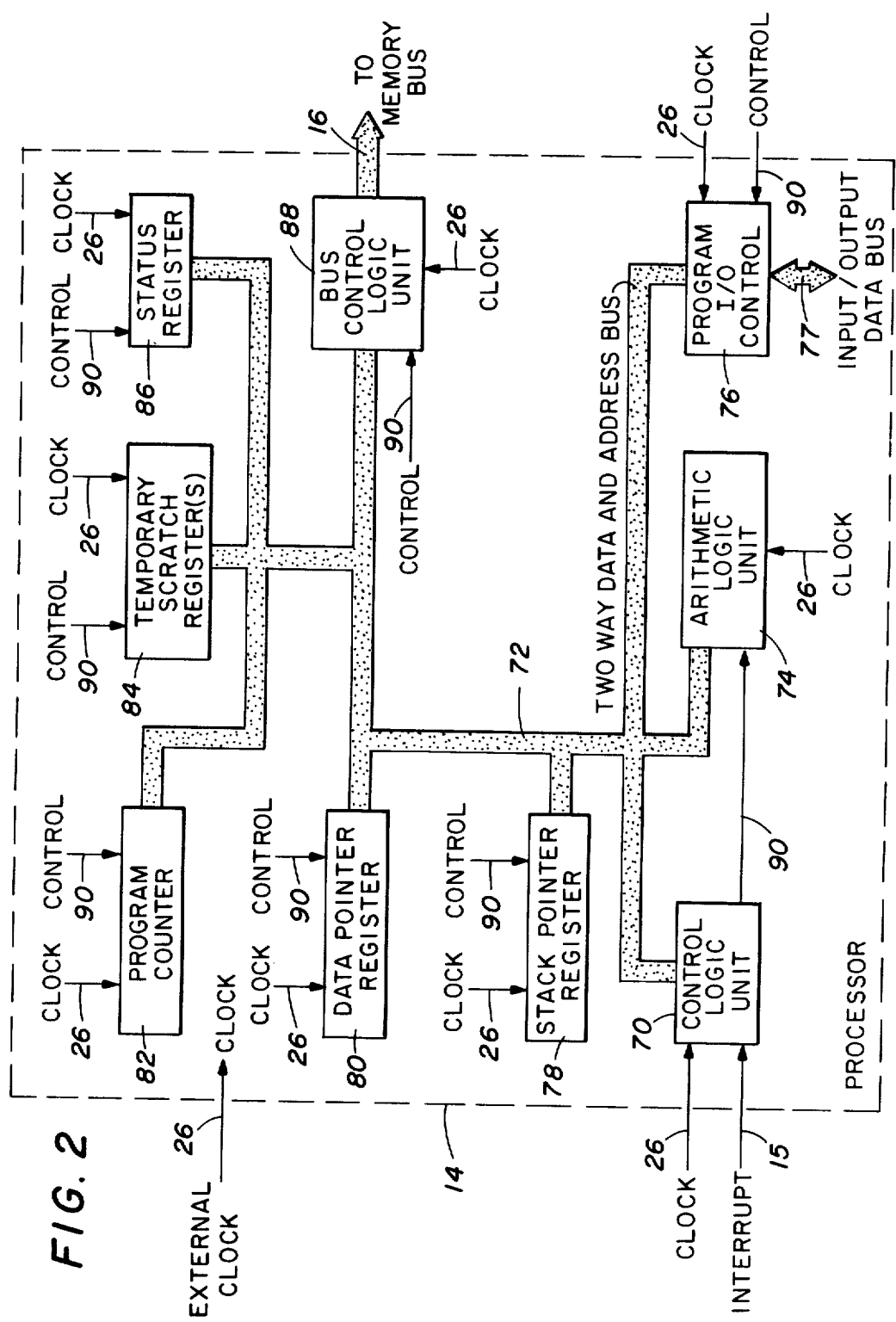
FIG. 2 is a block diagram illustrating the processor illustrated in FIG. 1.

The processor 14 performs the various control functions necessary for the word/data processing system to process, edit and display data. The processor 14 is connected by a memory bus 16 to a random access memory 18 for storing system data and programs. A visual display 20 is also connected by the memory bus 16 for displaying data and information for enabling communication between the system and an operator of the system. A diskette drive 22 is also connected through the memory bus 16 to the processor 14. The diskette drive 22 comprises means for accessing the system programs loaded from a program library onto diskettes. Modules in the program library may be loaded from the diskettes. The word/data processing system may include other direct memory access devices (not shown) connected by the memory bus 16 to the processor 14. A communication adaptor 24 is connected by the memory bus 20 to the processor 14 for enabling communications between the word/data processing system and other word/data processing systems. A system clock 26 provides a clock signal to the processor 14, memory 16, display 20, diskette drive 22 and communication adaptor 24 to drive the system. Input/output devices such as a printer may be part of the system and connected to the processor 14 through an input/output data bus (FIG. 2). The input/output devices are not shown in FIG. 1 since they are not necessary for an understanding of the communication system of the present invention.

Figures 10, 11:
FIG. 10 is an illustration of an example of the Setup Selection Menu visually displayed to the operator.
FIG. 11 is an illustration of an example of the Session Summary visually displayed to the operator.

The random access memory 18 is illustrated as it is configured for the Binary Synchronous Communications (BSC) feature to enable the system to send and receive documents. The operator selects the "Feature Tasks" from the Task Selection Menu appearing in the viewpoint of the display 20 and loads the BSC program diskette in the random access memory 18, which transfers control to the Setup Selection Menu (FIG. 10). After selecting a setup, control is passed to the Session Summary Frame (FIG. 11).

The random access memory 18 includes a keystroke control 30 to call Keystroke Service Routines 32 to select one of the send list menu options. A send queue manager 34 builds a menu control block 36 and communicates with a text storage buffer 38 to set up the information necessary for display. The codes stored in the text storage buffer 38 are constructed by the display access method 40. A display refresh buffer 42 stores the actual codes that are used by the display hardware operating under the control of the display control block 44.

The send queue manager 34 is connected via a control line and data bus to a communications controller 46. The information going from the keystroke service routine 32 and send queue manager 34 to the controller 46 is essentially to hold the send queue and to give the information as to jobs added, deleted on revised in the send queue after processing. The send queue manager 34 operates as a foreground controller and the communication-controller 46 acts as a background controller for the system. The send queue manager 34 also interfaces to the display through the controller 46, text storage buffer manager 48, buffer control block 50 and the text storage buffer 38 to present a visual display of the send queue to the operator.

The communication controller 46 operates to control the sending/receiving of data to the machine through the send buffer 52, receive buffer 54, communication access method 56 and communication control block 58. The communication access method 56 handles the communication protocol processing. The system communicates through the communication adapter 24.

The communication controller 46 also interfaces to the diskette for send/receive data through a send/receive controller 60, diskette buffer 62, diskette access method 64 and diskette control block 66. The diskette control block 66 controls the passing of a block of data to and from a diskette in the diskette drive 22.

Referring now to FIG. 2, the processor 14 is illustrated in further detail to show the typical hardware elements found in such processors. Processor 14 includes a control logic unit 70 which receives priority interrupt signals from the interrupt arbitrator 15. The control logic unit 70 communicates via a two-way data and address bus 72 to the arithmetic logic unit 74, program I/O control 76, stack point register 78, data point register 80, program counter 82, temporary scratch registers 84, status register 86 and bus control logic unit 88.

In response to a fetch instruction from the random access memory 18, the control logic unit 70 generates control signals 90 to the other logic units of the processor, including the arithmetic logic unit 74, the program I/O control 76, the program counter 82, temporary scratch registers 84, and bus control logic unit 88. Data processed in the processor 14 is input through the bus control logic unit 88 connected to the memory bus 16 and receives instructions for processing data to the input/output control 76. Synchronous operation of the control unit 70 with the other logic elements of the processor 14 is achieved by means of clock pulses input to the processor 14 for an external clock source 26.

Processed data from the processor 14 is output through the program I/O control 76 to an I/O data bus 77. (The input/output devices may be connected via I/O data bus 77 to the processor 14 but are not shown in FIG. 1). Input data on the data bus 72 is passed internally through the processor 14 to the control logic unit 70 by the arithmetic logic unit 74. The arithmetic logic unit 74, in response to a control signal from the control logic unit 70 in accordance with the instructions received from memory bus 16 performs arithmetic computations which may be stored in the temporary scratch registers 84. Other transfers of data between the arithmetic logic unit 74 and other logic elements of the processor 14 are possible. Such additional transfer is made to the program counter 82, the data point register 80 or a stack point register 78.

Also in a data stream for these various logic elements by means of the bus 72 is the status register 86. Operation of processor 14 is determined by instructions on the memory bus 16 and input data on the input data bus 12. For example, in response to received instructions the processor 14 may transfer data stored in the scratch registers 84 to one of the registers 78, 80 or 82. Such operation of processors as detailed in FIG. 2 are well known to those in the data processing field. A more detailed description of each operation of the processor 14 is not necessary for a complete understanding of the invention as claimed.

Referring to FIG. 3, the flow chart for the communication request menu processing is set forth. Following entry into the communication request menu processing routine, it executes the send queue selection instruction 100, and the routine advances to the inquiry 102 to determine if the add send job was selected. If the add send job was selected, the routine branches to the add send job routine 104. The flowchart for the add send job routine 104 is illustrated in FIG. 4 and described in more detail hereinbelow.

If no add send job was selected, the routine proceeds from inquiry 102 to inquiry 106 to determine if the display send jobs was selected. If it was selected, the routine branches to the display send jobs routine 108, illustrated in the flow chart diagram of FIG. 5 and described further hereinbelow. On completion of the display send jobs routine 108, the routine advances to wait for another selection or exit.

If no display send jobs was selected, the routine advances from inquiry 106 to inquiry 110 to determine if the delete send job was selected. If it was selected, the routine advances to call the delete send job routine 112, illustrated in FIG. 6 and described further hereinbelow. Upon completion of the delete send job subroutine, the communication request menu processing routine returns to wait for another selection or exit.

If the communication request menu processing routine determines that delete send job was not selected, it advances to the inquiry 114 to determine if the select next send job was selected. If it was selected by the operator, the routine branches to the select next send job subroutine 116, illustrated in FIG. 7 and described further hereinbelow. Upon completion of this subroutine, the communication request menu processing routine returns to wait for another selection or exits.

Referring to FIG. 4, the add send job subroutine 104 of the Communication Request Menu is illustrated as a flow chart diagram. The routine 104 first enters inquiry 120 to determine if the send queue is full. If the send queue is full the routine executes instruction 122 to prompt the operator of this condition and returns control to the operator. If the send queue is not full, the routine executes the instruction 124 to prompt the operator for the document and diskette name of an entry. The routine then executes the instruction 126 to determine if the prompting was successful, and if it was not, the routine returns control to the operator.

If the prompting was successful, the routine executes instruction 128 to build default values for the send entry. The routine then enters inquiry 130 to determine if the document options are still to be defined. If it is determined that the document options are still to be defined, the routine proceeds to call the send document option subroutine, illustrated in FIG. 8 and described further hereinbelow. However, if the document options have been defined, the routine branches around the subroutine and enters instruction 134 to prompt the operator the job has been added to the queue and returns control to the operator.

Referring to FIG. 5, the display send jobs routine 108 of the Communication Request Menu Processing is set forth as a flow chart diagram. Upon entry into the routine, it first determines at inquiry 140 if there are any send entries in the queue. If there are none, the routine exits to execute instruction 142 to prompt the operator of this condition and returns control to the operator. If there are send entries in the queue the routine executes instruction 144 to hold the send queue, allowing only the currently sending job to be completed. By completion of this instruction, the routine executes the instruction 146 to indicate the first set of entries to be displayed.

The display send jobs routine 108 advances to instruction 148 to call the build send queue menu options subroutine, illustrated in FIG. 9 and described further hereinbelow. Upon execution of subroutine 148, the display send jobs routine 108 advances to inquiry 150 to determine if send document options are available. If they are not the routine executes instruction 152 to make all send entries non-selectable. Upon completion of instruction 152 or upon determining that the send document options are available, the routine advances to execute instruction 154 to present the display send jobs menu for operator processing.

The display send jobs routine 108 determines through inquiry 156 if the send entry was selected. If it was selected, the routine advances to instruction 158 to call the send document options routine, illustrated in FIG. 8 and described further hereinbelow. If no send entry was selected the routine branches around instruction 158 at the same point in the routine following completion of the instruction 158 to execute the inquiry 160 to determine if the operator is finished. If the operator is not finished, the routine loops back to continue the routine from instruction 148 for the building on the next send queue. When the decision block 160 indicates the operator has finished, the routine advances to instruction 162 to release the hold on the send queue implemented by execution of instruction 144. After release of the hold on the send queue the routine returns control to the operator.

Referring to FIG. 6, the delete send job routine 112 of the Communication Request Menu is illustrated as a flow chart diagram. Upon entry into the routine 112, inquiry 164 determines if there are any send entries in the queue. If there are no send entries in the queue, the routine exits to the instruction 166 to prompt the operator of this condition and returns control to the operator for action.

If there are send entries in the queue, the routine advances to instruction 166 to hold the queue allowing only the current sending job to be completed. The routine then advances to instruction 168 to indicate the first set of entries to be displayed.

The delete send job routine, upon determining the first set of entries to be displayed, executes instruction 170 to call the build send queue menu options subroutine, illustrated in FIG. 9 and described further hereinbelow. Upon execution of subroutine 170, the delete send job routine 112 executes instruction 172 to present the delete send job menu to the operator for processing. In the first processing step inquiry 174 determines if the send entry was selected. If it was selected, the routine enters inquiry 176 to determine if the selected entry is the one that is currently being sent. If it is the one being sent, the instruction 178 prompts the operator that he/she cannot select the currently sending job. If the entry is not the one being sent currently, the routine executes the instruction 180 to delete the entry update send queue in memory and returns to inquiry point 182 to determine if the operator is finished. If the operator is not finished, the routine branches back to the instruction 170 to again call the build send queue memory options routine. If the operator is finished, instruction 184 is executed to release the hold on the send queue and return control to the operator.

Figure 7:
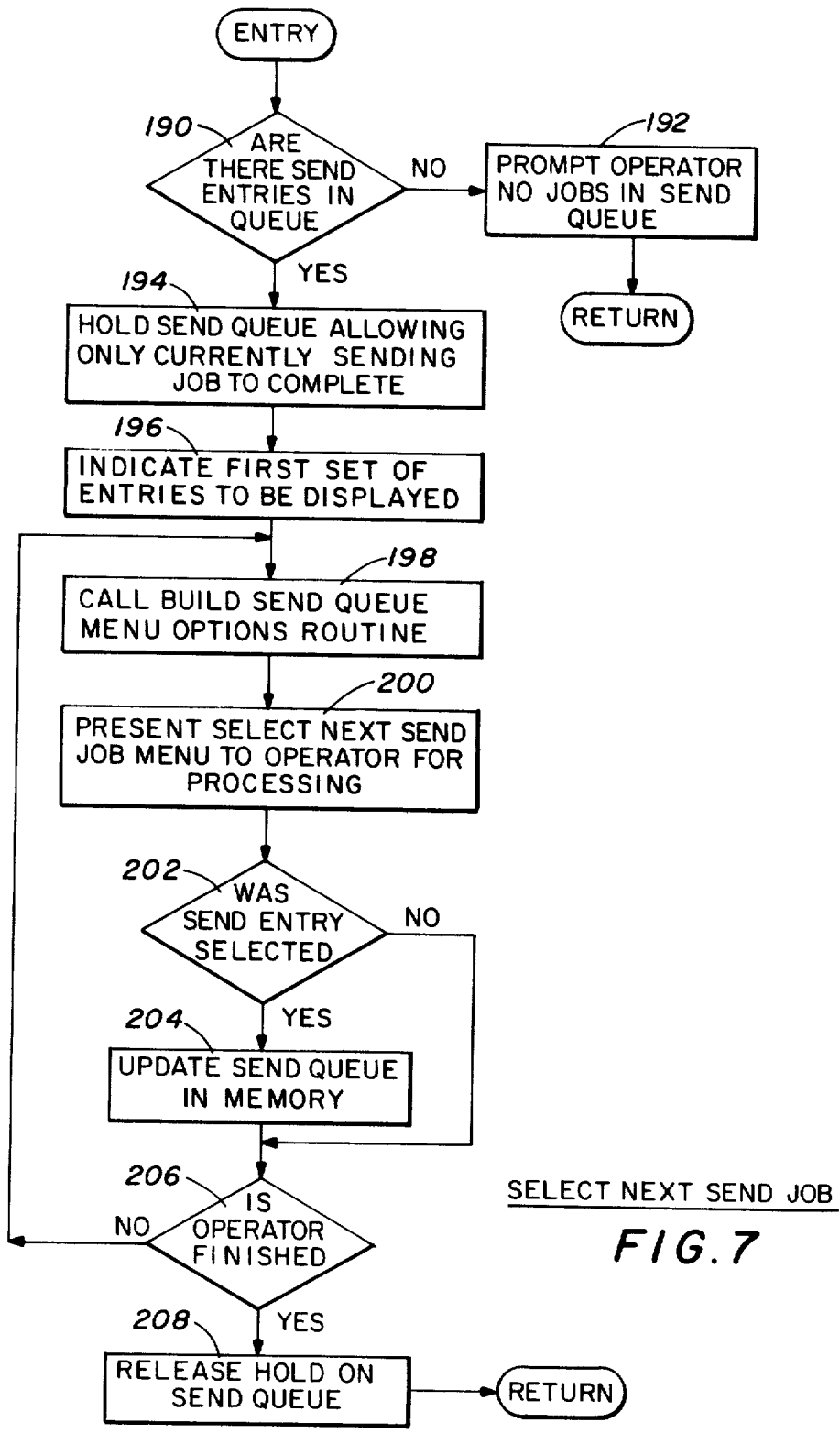
FIG. 7 is a flow chart diagram of the select next send job routine.

Referring to FIG. 7, the select next send job routine 116 of the Communication Request Menu is set forth in flow chart diagram. Upon entry into the routine 116, inquiry 190 determines if there are send entries in the send queue. If there are none, the instruction 192 prompts the operator that there are no jobs in the send queue and returns control to the operator. If there are send entries in the queue, the instruction 194 is executed to hold the send queue allowing only the currently sending job to be completed. The instruction 196 is executed to indicate the first set of entries to be displayed. The instruction 198 calls the build send queue menu options subroutine, illustrated in FIG. 9 and described further hereinbelow.

Upon execution of subroutine 198, the instruction 200 is executed to present the select next send job menu to the operator for processing. The inquiry 202 determines if the send entry was selected. If it was selected, instruction 204 is executed to cause the send queue to be updated in memory and inquiry 206 determines if the operator is finished. If the send entry is not selected, the routine branches around the instruction 204 to inquiry 206 to determine if the operator is finished. If the operator is not finished the routine, the program branches back to execute the subroutine 198. If the operator is finished, the instruction 208 is executed to release the hold on the send queue and control is returned to the operator.

Figure 8:
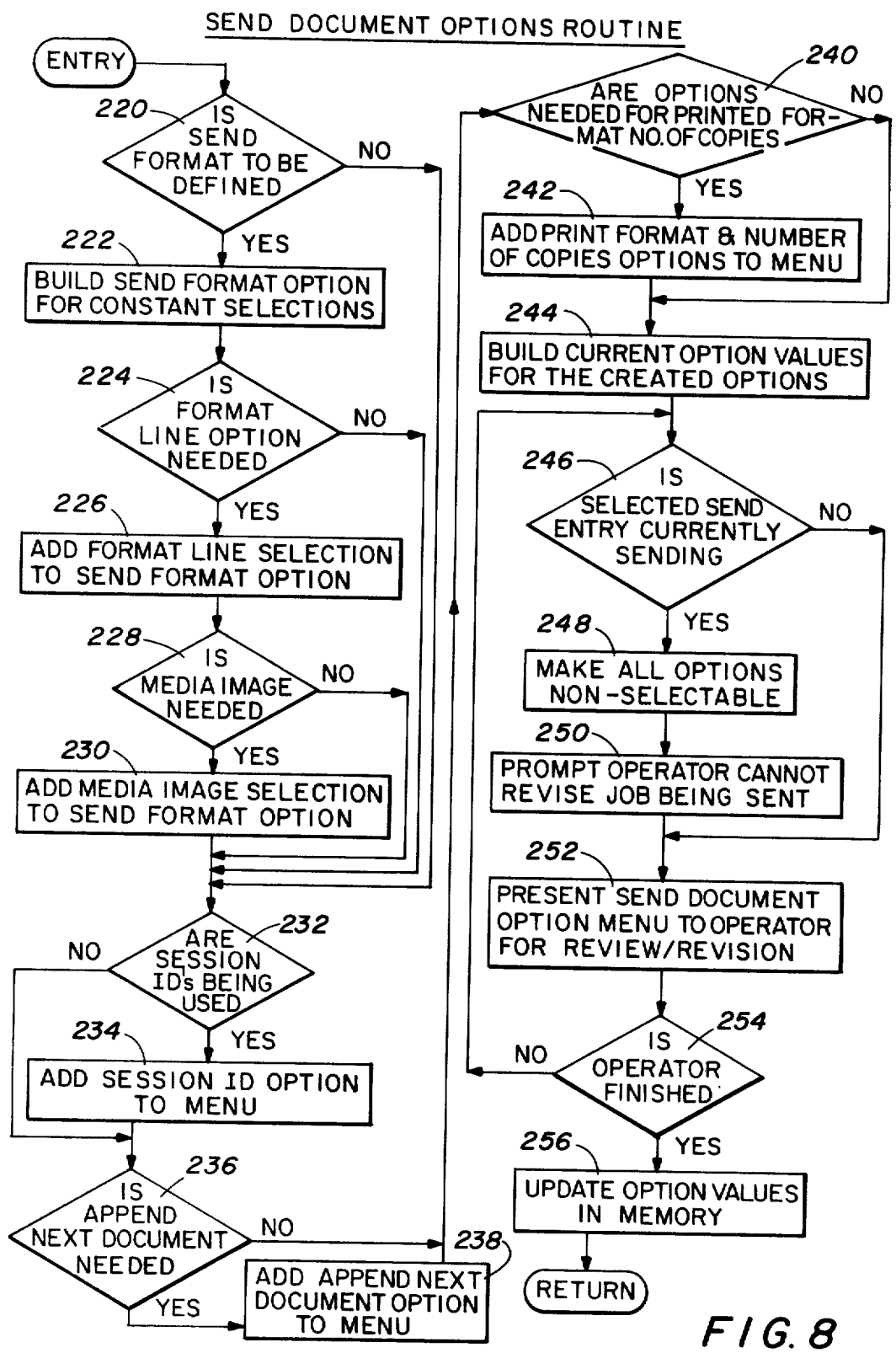
FIG. 8 is a flow chart diagram of the send document options routine.

Referring to FIG. 8, the send document options routine is presented as a flow chart diagram. Upon entry into the routine, the decision instruction 220 is executed to determine if the send format is to be defined. If it is not to be defined, the routine branches around to inquiry 232 to determine if session identifications are being used. However, if the send format is to be defined, the routine executes the instruction 222 to build the send format option for constant selections. The routine then determines from inquiry 224 if the format line option is needed. If it is not needed, the routine branches to inquiry 232. If the format line option is needed, the instruction 226 is executed to add format line selection to the send format option. Inquiry 228 determines if a media image is needed. If a media image is not needed, the routine again branches to the inquiry 232. If a media image is needed, the instruction 230 is executed to add image media image selection to the send format option.

The inquiry 232 determines if there are session identifications being used. If they are being used, the routine executes the instruction 234 to add the session identification option to the menu and advances to inquiry 236 to determine if the append next document is needed. If the session identifications are not being used, the routine branches around to the inquiry 236. If the append next document is needed, the routine advances to the instruction 238 to add the append next document option to the menu, then the routine advances to the decision 240 to determine if options are needed for print format and number of copies. If it is not necessary to append next documents, the routine branches around instruction 238 to the inquiry 240. If the options of inquiry 240 are needed, the routine executes instruction 242 to add print format and number of copies options to the menu, and then instruction 244 is executed to build the current option values for the created options. However, if the print format and number of copies options are not needed, the routine branches around instruction 242 to execute instruction 244.

Following the building of the current option values, the routine enters inquiry 246 to determine if the selected send entry is currently sending. If it is selected, the routine executes the instruction 248 to make all options nonselectable and instruction 250 to prompt the operator that it cannot revise the job being sent. If the selected send entry is not the one that is currently being sent, the routine simply branches around the instructions 248 and 250. The instruction 252 is then executed to present the send document option menu to the operator for review/revision. After the operator completes the review/revision of the send document option menu, the routine enters inquiry 254 to determine if the operator is finished. The operator is not finished, the routine branches back to the inquiry 246 to determine the status of the selected send entry. However, if the operator is finished the routine executes the update option values and memory instruction 256 and returns control to the operator.

Figure 9:
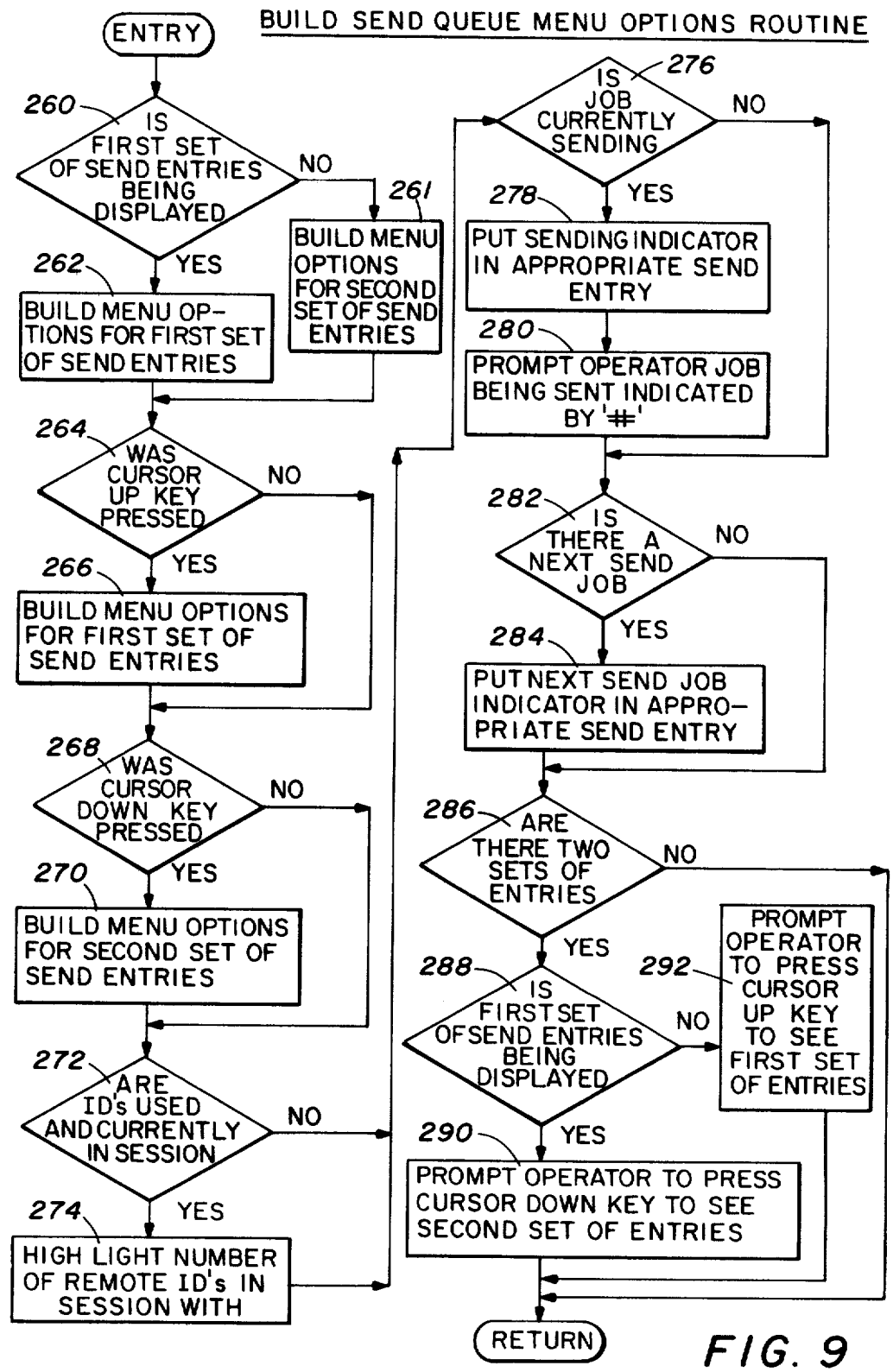
FIG. 9 is a flow chart diagram of the build send queue menu options routine.

Referring to FIG. 9, the build send queue menu options routine is illustrated in flow chart diagram. Upon entry into the routine, inquiry 260 determines if the first set of send entries is being displayed. If it is being displayed, the build menu options for the first set of send entries instruction 262 is executed, and the routine advances to inquiry 264 to determine if the cursor up key was pressed. If the inquiry 260 determines that there is not a first set of send entries being displayed, a build menu options for second set of send entries instruction 261 is executed and program advances to the inquiry 264.

If the cursor up key was pressed, instruction 266 is executed to build menu options for the first set of send entries. If the cursor up key was not pressed, the routine branches around this instruction. Following the building of the menu options, inquiry 268 determines if the cursor down key was pressed. If it was pressed, the instruction 270 is executed to build menu options for the second set of send entries. If it was not depressed, the routine branches around this instruction. Upon the building of the menu options of the second set, the routine enters the inquiry 272 to determine if the I.D.'s are used currently in session. If the response to inquiry 272 is affirmative, the routine executes instruction 274 to highlight the number of remote I.D.'s in session, but if they are not used or not currently in session the routine branches around this instruction. The routine then enters inquiry 276 to determine if there is a job currently sending. If the result of the inquiry is affirmative, the routine advances to instruction 278 to put the sending indicator in the appropriate send entry and instruction 280 prompts the operator as to the job being sent by indication in the display of the "#" on the display. If there is no job currently sending the routine branches around the instructions 278 and 280.

The routine then enters the inquiry 282 to determine if there is a next send job. If there is a next send job, the instruction 284 is executed to put the next send job indicator in the appropriate send entry. If there is not a next send job, the routine branches around the instruction 284. Inquiry 286 next determines if there are two sets of entries, and if there are inquiry 288 determines if the first set of send entries is being displayed. If the first set of send entries is being displayed, the instruction 290 is executed to prompt the operator to press the cursor down key to see the second set of entries. If there are not two sets of send entries, the program branches around inquiry 288 to return control to the operator. If the first set of send entries is not being displayed, the routine causes instruction 292 to be executed to the prompt the operator to press the cursor up key to see the first set of entries and returns control to the operator.

The Binary Synchronous Communication (BSC) feature of the present invention enables the communicating word/data processor to send and receive documents. In the IBM Communicating Displaywriter incorporating the features of the present invention, documents may be sent and received at a rate of up to 4,800 BPS. Documents may be exchanged with other machines that support communication with the word/data processor of the present invention.

Binary Synchronous Communications is a foreground batch-oriented application which provides several functions in addition to its document send and receive capability. The operator can indicate documents to be sent by building a queue using facilities available on the request task menu. These facilities are available even during an active communication session for operator display and update of the send document queue. The operator may select specific destinations for each document in the send queue, which allows selective exchange of documents depending upon the identity of the remote machine. The session summary feature on the display contains the communications status information for easy operator reference and control of the communications session. A copy of the session summary may also be written into a diskette document to provide an audit trail of communications activity. Communications specific options may be provided to allow communication with a variety of different machines that have slightly different communications characteristics. This communications format information is saved on a program diskette in a Setup so that an operator need only be concerned with establishing the communications environment of each remote machine once. Operators can then use the communications setup without learning the communications specific parameters that it contains. Communications options normally will not be updated once defined.

An unattended mode of operations is provided in addition to an attended mode. Communications can be initialized to handle sessions with various callers without an operator present, which allows overnight communication when long distance rates are lower. The system of the present invention also provides a mechanism for transferring document formatting information, whereby the operator may select an appropriate formatting transmission option either on a job basis or an entire communications activation depending upon the requirements of the remote station.

In operation, the first menu presented to the operator after the initialization routine is the "Task Selection Menu." From this menu the operator selects the "Features Task" and loads the BSC program diskette which transfers control to the Setup Selection Menu (FIG. 10). After selecting a setup from the menu, control is passed to the Session Summary Frame. FIG. 11 is an illustration of an example of a Session Summary Frame showing the entry of various status lines containing status information. At this point the operator may activate communication and begin receiving documents and/or access the Request function through keyboard 10. After selecting the "communication" request function, the operator may then access additional menus which allow adding or deleting documents in the send queue, change send document options, or specify which job to send next.

The system then returns control to the Session Summary Frame where the operator monitors communication activity or may again choose to enter the request task menu. The operator ends communication from the Session Summary Frame, and control is returned to the Setup Selection menu where the same or another setup may be selected or control may be returned to the Task Selection menu to select another task.

The purpose of the communication setups is to define those fixed communication options (e.g., protocol, code set) which are required to operate in a compatible mode with a specific terminal type or host application. These setups are defined and retained on program diskette, thereby eliminating the need for the operator to respecify (or even be aware of) these options for each communication task. In order to prepare the communication task, the operator merely selects the appropriate setup, identifies the specific documents to be sent, and, if necessary, changes the several variable sessions options (e.g., attended/unattended mode).

The Setup Selection menu of FIG. 10 allows the operator to select one of the "named" setups to be used for a current communication task. An "unused" setup is an invalid selection in the setup selection in the menu.

After setup selection, the Session Summary Frame will be presented to the operator on the display 20. From this frame the operator can determine the current status of the communication task and review the current communication activity. Initially the session summary frame is blank, and as communication activity proceeds each summary entry is shown on the display. As the summary view port on the display 20 fills up, the number of lines necessary to display the next entry will be rolled off the display and the latest entries goes in at the bottom of the display.

The Communication Request Task menu is displayed as a result of pressing the "request" key on keyboard 10 or upon return from one of the subordinate menus as illustrated in FIG. 3 and described hereinabove. During BSC the communication request must return control to the session summary frame before the BSC task can be terminated.

The send queue is a list of documents scheduled for sending during the communication task. Normally, the first document in the list will be the first document sent in a session. If session identifications are defined, documents not selected for the current remote ID will not be sent. The operator can prepare the send queue before establishing the line, i.e., create the send queue, review/revise send document options, delete jobs and so forth. In addition, the same operations can be done any time during the act of communication.

The purpose of the Send Document Options menu illustrated in FIG. 8 and described hereinabove is to solicit information, not specified in the active setup, as required to communicate a specific send job. In contrast to setups where option values apply for all activity during the communication task, the options specified in the Send Document Options menu apply only to that specific send job. The send document options menu is a conditional menu. The content of this menu depends upon option values in the active setup. Only those required options not specified in the active setup are presented. An example of the send document options menu is shown in a FIG. 13. If no required options need to be specified, the Send Document Options menu will not be presented.

The options available to the send document option menu include the following: print format, number of copies, send format, append next document, and valid remote identifications. The print format is a set of default parameters to tell the IBM 6670 printer which print format to use. The number of copies defines the number of copies to be printed by the 6670. The send format option determines which data stream format the system will use when sending data. The append next document option indicates that a BSC protocol job boundary is to occur at the end of the send document. The valid remote ID's option allows the operator to invoke the second level of the selective send function. The first level of the selective send function involves a validation of a remote station attempting to communicate with the system. If the remote station does not send a remote ID (session ID) or the remote ID of the station does not match one of the remote ID's defined in the setup, no communication will take place. If a successful session ID exchange occurs, then document communication will be initiated. In the valid remote ID option of the second level, the operator may select all or a subset of the remote ID's. During send, each job in a queue list will be checked to determine if the ID to a remote station is one of the valid remote ID's specified for that job. If the remote ID is valid for that job, the system will send it. If the remote ID for the station is not valid, that job will be skipped.

The Display Send Queue menu is presented as a result of selecting the "Display Send Queue" option in the Communications Request menu. From this menu the operator can review the current send queue and the status of that send queue. In addition, by selecting the identification associated with a specific job, the send document options (if available) will be presented if the send document option can be reviewed/revised.

An example of a Display Send Queue menu is illustrated in FIG. 14. The Display Send Queue menu of FIG. 14 includes session ID's defined. If no remote ID's have been defined, the remote ID field will not appear. Symbols may be used to reflect the status of the send queue. The "#" reflects the currently sending entry. The ">" indicates the next job to be sent. For each send queue entry an "*" will appear in the remote ID column for which that job is designated to be sent.

A Delete Send Job menu is illustrated in FIG. 15 and is presented as a result of selecting this option in the Communications Request menu. If no send jobs exist, the menu will not be presented and the display will post a message "no jobs in send queue" prompt. After entering the Delete Send Job menu, only the currently sending job will be processed. Upon the completion of this job, a hold state will be entered. The send process will not continue until the operator returns to the Communication Request menu. The purpose of the Delete Send Job Menu is to allow the operator to delete any job, except the job currently being sent from the send queue.

The Select Next Send Job menu is illustrated in FIG. 16 and is presented as the result of selecting the "next send job" option in the Communication Request menu. The purpose of the select next send job menu is to allow the operator to start/restart the sending process from any position within the send queue. If no send jobs exist, the Communication Request menu will be presented with the following message to be posted "no jobs in send queue."

To select the next send job, the operator selects the ID associated with the desired job and presses "enter." The select next send job menu is redisplayed with the "#" indicating the selected job.

Although the preferred embodiments of the invention have been illustrated in the accompanying drawings and described in the foregoing detailed description, it will be understood if the invention is not limited to the preferred embodiment disclosed, but is capable of numerous rearrangements, modifications, substitution of parts and elements without departing from the spirit of the invention.

What is claimed is:

1. A data communication system for enabling one data transmitting display terminal to communicate with at least one data receiving terminal, the improvement wherein the data transmitting display terminal comprises:
   means for forming a queue of entries identifying documents to be transmitted, each of said documents identified by an entry in said queue;
   means for sequentially transmitting the documents identified by the entries in said queue;
   means operative during said transmission for accessing entries from said queue prior to the transmission of the documents identified by said accessed entries;
   means responsive to said means for accessing for completing the transmission of a document being transmitted;
   means operative during said transmission for displaying said accessed entries; and
   means operative during said transmission for altering said accessed entries prior to the transmission of said documents identified thereby.

2. The data communication system of claim 1 wherein said means for altering further comprises:
   means for starting the transmission process from any entry in the queue wherein one or more previously transmitted documents are retransmitted or one or more documents are skipped during transmission.

3. The data communication system of claim 2, wherein said means for starting includes operator controlled display means for selecting the entry in said queue of entries where transmission is to continue.

4. The data communication system of claim 1 wherein said means for altering said accessed entries includes means for adding an entry to said queue of entries.

5. The data communication system of claim 1 wherein said means for altering said accessed entries includes means for deleting an entry from said queue of entries.

6. The data communication system of claim 5, wherein said means for deleting a document from said queue of entries further comprises:
   means for displaying said queue of entries;
   means for indicating the entry in said queue identifying the document currently being transmitted;
   means for indicating the next entry in said queue of entries identifying the next document to be transmitted; and
   means for selecting an entry to be deleted from said queue of entries.

7. The data communication system of claim 1 wherein said means for altering said accessed entries includes:
   means for reviewing send document options associated with said accessed entries of said queue; and
   means for revising said send document options.

8. The data communication system of claim 7 wherein said means for revising said send document options includes means for selecting a data stream format to be used in transmitting said queue of entries.

9. The data communication system of claim 7 wherein said means for revising said send document options includes means for validating an identification of a remote data transmitting terminal to allow transmission of said queue of entries.

10. The data communication system of claim 9 wherein said means for validating a remote transmission terminal identification comprises:
    means for defining transmission terminal identifications;
    means for storing said defined transmission terminal identifications;
    means for comparing a requesting remote terminal identification with said stored identifications to allow transmission when said stored identification matches said requesting terminal identification.

11. The data communication system of claim 10 and further comprising means for selecting a subset of permissible remote terminal identifications from said stored terminal identifications.

12. The data communication system of claim 1 and further comprising means connected to said means for transmitting for defining fixed communication options for placing the transmitting terminal and receiving terminal in a compatible mode for communicating.

13. The data communication system of claim 12 and further comprising means for storing said defined communication options, whereby communications between transmitting and receiving terminals may be setup without respecifying said defined fixed communications options.

14. The data communication system of claim 1 and further comprising means for generating transmission status information and displaying said status of the transmission of said documents identified by said queue of entries.

15. The data communication system of claim 14 further including means for selecting said means for altering, wherein said means for displaying the status continually displays the status information unless the operator selects said means for altering said accessed entries.

16. The data communication system of claim 1 wherein said means for accessing entries in said queue comprises:
    means for generating a menu of communication request tasks;
    means for requesting access to said menu of communication request tasks;

means for displaying said accessed menu of communication request tasks; and means for selecting one of said communication tasks from said menu.

17. The data communication system of claim 1, wherein said means for forming a queue further comprises:

means for forming said queue prior to establishing the transmission of said documents; and means for forming said queue during the active transmission of documents between the transmitting and receiving terminals.

18. The data communication system of claim 1 and further comprising means for selecting transmission of said documents in an unattended operator mode.

19. A data communication system for enabling one data transmitting display terminal to communicate with at least one data receiving terminal, the improvement wherein the data transmitting display terminal comprises:

means for forming a queue of entries identifying documents to be transmitted, each of said documents identified by an entry in said queue;

means for sequentially transmitting the documents identified by the entries in said queue;

means operative during said transmission for accessing entries from said queue prior to the transmission of the documents identified by said accessed entries;

means operative during said transmission for displaying said accessed entries and send document options associated with said accessed entries; and means operative during said transmission for altering said send document options associated with said accessed entries prior to the transmission of said documents identified by said accessed entries.

* * * * *